US008543527B2

(12) United States Patent
Bates et al.

(10) Patent No.: US 8,543,527 B2
(45) Date of Patent: Sep. 24, 2013

(54) METHOD AND SYSTEM FOR IMPLEMENTING DEFINABLE ACTIONS

(75) Inventors: Phil Bates, Bristol (GB); Martin Hogg, Bristol (GB); Geoffrey Weeks, Redhill (GB); Paul Davis, Swindon (GB); Joel Crisp, Austin, TX (US); Adam Bloom, Bristol (GB)

(73) Assignee: Oracle International Corporation, Redwood Shores, CA (US)

( * ) Notice: Subject to any disclaimer, the term of this patent is extended or adjusted under 35 U.S.C. 154(b) by 931 days.

(21) Appl. No.: 12/684,861

(22) Filed: Jan. 8, 2010

(65) Prior Publication Data

US 2011/0173680 A1 Jul. 14, 2011

(51) Int. Cl.
*G06F 17/00* (2006.01)
(52) U.S. Cl.
USPC .......................................................... 706/45
(58) Field of Classification Search
USPC ................................................ 706/12, 45, 62
See application file for complete search history.

(56) References Cited

U.S. PATENT DOCUMENTS

2007/0106754 A1* 5/2007 Moore .......................... 709/217
2009/0172773 A1* 7/2009 Moore ............................. 726/1

FOREIGN PATENT DOCUMENTS

EP 1 628 256 A1 2/2006

* cited by examiner

*Primary Examiner* — David Vincent
(74) *Attorney, Agent, or Firm* — Kilpatrick Townsend & Stockton LLP

(57) ABSTRACT

A method and system is provided for use in business intelligence and reporting. The method and system are able to implement one or more definable actions when presented with data. The data may be produced by a business intelligence application. The actions may relate to activities performed by a user or an agent. The system comprises an action manager, a repository, a data association manager and an implementation engine. In one embodiment a data mining engine is provided. The system enables the availability of an action in response to the execution of analytic queries to be determined based on a relationship defined by the data association manager. If an action is available, an action definition is used to invoke a target in response to selection of the action by an entity, the invocation of the target including propagating data produced by an analytic engine into the target based on metadata to perform the action.

26 Claims, 10 Drawing Sheets

METHOD AND SYSTEM FOR IMPLEMENTING DEFINABLE ACTIONS

BACKGROUND OF THE INVENTION

1. Field of the Invention

The present invention is in the field of systems for providing business intelligence and reporting. In particular, the present invention provides a method and system for implementing one or more definable actions when presented with data. The data may be produced by a business intelligence application. The actions may relate to activities performed by a user or an agent.

2. Description of the Related Art

Business intelligence (BI) applications are well known in the art. Suppliers of business intelligence applications include Cognos (part of IBM Corporation), SAP AG, Microsoft Corporation, SAS Institute Incorporated and Oracle Corporation. A business intelligence application may provide functions such as data analysis, data mining, data search, reporting, performance measures, accounting, and charting. One or more business intelligence applications may operate concurrently to provide a business intelligence platform with wide functionality. Business intelligence applications may include both bespoke and turnkey solutions.

A business intelligence application typically accesses and processes data stored in one or more databases. The databases may be part of one or more data warehouses; i.e. structured data arranged according to specific data models to facilitate data analysis and extraction. Data may be accessed through one or more applications that interface with the business intelligence application.

For example, for a business entity in a manufacturing environment, there may be one or more databases that store data documenting products, employees, offices, manufacturing locations, equipment, suppliers, customers and production schedules. A business intelligence application or suite of applications is designed to interrogate this data and provide indicators and relevant information to manage the running of the entity. While the data itself may be specific to a business environment, the storing, analysing and processing of data requires technical considerations.

The operations of modern companies typically require the integration of heterogeneous processes, workflows, services, functions and content with one or more business intelligence applications. For example, a manufacturing company may have a first system comprising a first application and an associated database that manages human resource data such as employer records. It may also have a second system comprising a second application and an associated database for monitoring and controlling production lines. The company may then wish to assign employees to a particular production line and monitor productivity data; to do this the two systems need to be integrated. In the prior art, the integration of separate systems has been difficult. It is typically achieved by writing computer program code in the form of a third application that is designed to interface with the two systems. This approach is complex, requires detailed technical knowledge of the workings of both systems and the resultant solution is difficult to reuse or repackage.

Additionally, prior art solutions to the problem of data integration are typically limited when it comes to interaction with a user. These solutions are primarily designed to integrate data for processing and presentation; as such a user can only passively view integrated data. Determining how to act when faced with reports and other information is a difficult task. It often relies on the experience of users coupled with complex rules that are traditionally embedded into an application. These are difficult to adapt and change as circumstances change in real time.

There is therefore a problem in the art of providing consistency, security and simplicity when integrating, analysing and interacting with heterogeneous, and possibly distinct, processes, workflows, services and sources of data. There is also the need to provide consistency, security and simplicity when integrating, analysing and interacting with business intelligence applications and computer-implemented business processes. These features are required to allow a modern company to function efficiently. There is also a need in the art for systems that can be operated by a wide variety of users, including those who have limited skills or experience, both technically and with regard to computer-implemented business processes, and to provide assistance to these users so that they may optimally manage a modern company.

BRIEF SUMMARY OF THE INVENTION

According to a first aspect of the present invention a system comprises an action manager adapted to generate an action definition, the action definition defining an action to be selected by an entity, the action comprising the invocation of a target, the action definition comprising metadata for use in locating the target and for use in propagating one or more parameters to the target; a repository adapted to store the action definition generated using the action manager; a data association manager adapted for use in defining a relationship between data produced by an analytic engine through the execution of one or more analytic queries and the action definition; and an implementation engine adapted to determine whether the action is available in response the execution of analytic queries, based on the relationship defined by the data association manager, and, if available, to use the action definition to invoke the target in response to selection of the action by the entity, the invocation of the target including propagating data produced by the analytic engine into said target based on the metadata to perform the action.

This system effectively codifies what actions a user should take in a set of given circumstances, reducing the need for experienced staff and/or expensive training programmes. The system enables consistent activity patterns to be implemented and reused in a variety of contexts.

An action, in the context of the present invention, may be a sequence of one or more computer-implemented operations that are initiated by an implementation engine or other suitable implementation component when the presence of particular analytic data or conditions is observed. The form of initiation may vary depending on the form of the target, but could comprise a function call, a Uniform Resource Locator (URL), or a command. Preferably, an action is selected by a user or agent, collectively referred to herein as an entity.

An action needs to be referenceable, for example, nameable and locatable so that it can be re-used in multiple scenarios. An action comprises the invocation of a target. The target may comprise a function, process or service, which may be located on an external system, i.e. a system external to the implementation engine. In certain embodiments, such a system may also be external to the server computer providing the implementation engine, although this need not be the case for all functions, processes or services. Invoking a target may also comprise navigating to a target location; for example, invoking a web-server to deliver an Extensible Markup Language (XML) or HyperText Markup Language (HTML) file or invoking a network service to navigate to a network location.

The target of an action may accept parameters, referred to as action parameters. The implementation engine may pass action parameters that are accepted by the target. The action parameters may be based on data produced by an analytic engine. This process may be seen as propagating data to an external system; as such a process may involve mapping or transforming the data produced by the analytic engine. Propagating may also comprise looking up action parameter values from a database based on initial data produced by the analytic engine.

An action is available to be taken based on a particular data context, wherein the presence of particular analytic data or conditions forms the data context. A data context may be defined by the presence of particular analytic data, conditions and/or a particular temporal state. For example, a data context may be defined by zero or more data parameters that may be set based on analytic data generated by the analytic engine, system-wide or user-session variables and constants, data added by user interaction at the time of invocation, and/or zero or more conditional rules or predicates determining the action to be taken.

The data association manager may be adapted to define one or more conditional rules that specify when the action associated with the action definition is available; the conditional rules may be based on at least one of the data produced by the analytic engine and session information for the entity.

The system may further comprise one or more discovery services adapted to inspect an external system and generate values for the metadata for use in locating the target and the parameters to be propagated to the target.

Preferably, the action manager and/or the data association manager are further adapted to generate mapping metadata that defines any data transformations that are required to transform the data produced by the analytic engine into a form suitable for the target.

Preferably, the action manager is further adapted to generate one or more of presentation metadata for the action definition that defines how an action to be selected is presented to a user, said presentation metadata optionally comprising a description of the action, a description of the one or more parameters to be propagated to the target and/or the manner in which any data returned by the action is to be presented; and security metadata for the action definition comprising at least one of security credentials for the target, entity permissions for modification of an action definition, and entity permissions for selection of an action.

An action may be invoked securely both through the use of secure channels of communication, for example, a virtual private network (VPN) connection, and the ability to pass security credentials from the implementation engine through to the target.

Preferably, the data association manager is further adapted to assign an action defined by an action definition to an artifact, the artifact being configured to output the data produced by the analytic engine, the assignment defining at least a portion of the relationship between the data produced by the analytic engine and the action definition.

Preferably, the invocation of a target comprises invoking one of a function, process, script, workflow or service or navigating to an external system.

Preferably, the action manager is further adapted to modify an existing action definition within the repository.

The system may further comprise a data mining engine comprising a selection component to record a specific action selected by an entity in the presence of specific data produced by the analytic engine; a monitor component adapted to receive data indicative of the outcome of a selected action; and a recommendation component adapted to receive data from the selection and monitor components and produce a learning data model that dynamically models the relationship between the data produced by the analytic engine and one or more action definitions so as to recommend a set of one or more suitable actions in response to the execution of analytic queries.

Preferably, the data mining engine is adapted to dynamically assign one or more action definitions to a stub action definition in response to the execution of one or more analytic queries, and the implementation engine is adapted to use the stub action definition after assignment to provide a set of suitable available actions.

Preferably, the entity is a user or an agent and the system respectively further comprises a graphical user interface wherein the implementation engine is further adapted to provide available actions for selection by the user using said interface; or an agent interface wherein the implementation engine is further adapted to provide available actions for automated selection by the agent using said interface.

According to a second embodiment of the present invention a computer-implemented method for implementation on a processor comprises generating an action definition, the action definition defining an action to be selected by an entity, the action comprising the invocation of a target, the action definition comprising metadata for use in locating the target and for use in propagating one or more parameters to the target; storing the action definition; defining a relationship between data produced by an analytic engine through the execution of one or more analytic queries and the action definition; determining whether the action is available in response the execution of analytic queries, based on the previously defined relationship; and if the action is available, using the action definition to invoke the target in response to selection of the action by the entity, the invocation of the target including propagating data produced by the analytic engine into said target based on the metadata to perform the action.

Preferably, the step of defining the relationship comprises defining one or more conditional rules that specify when the action associated with the action definition is available, the conditional rules being based on at least one of the data produced by the analytic engine and session information for the entity.

The method may further comprise, before the step of generating an action definition inspecting an external system using one or more discovery services; and generating values for the metadata for use in locating the target and for use in propagating one or more parameters to the target.

Preferably, the step of generating an action definition and/or defining the relationship further comprise generating mapping metadata that defines any data transformations that are required to transform the data produced by the analytic engine into a form suitable for the target.

Preferably, the step of generating an action definition further comprises generating presentation metadata for the action definition that defines how an action to be selected is presented to a user, said presentation metadata optionally comprising a description of the action, a description of the one or more parameters to be propagated to the target and/or the manner in which any data returned by the action is to be presented; and generating security metadata for the action definition comprising at least one of security credentials for the target, entity permissions for modification of an action definition, and entity permissions for selection of an action.

Preferably, the step of defining the relationship further comprises assigning an action defined by an action definition to an artifact, the artifact being configured to output the data produced by the analytic engine, the assignment defining at least a portion of the relationship between the data produced by the analytic engine and the action definition.

Preferably, the invocation of a target comprises invoking one of a function, process, script, workflow or service or navigating to an external system.

The method may further comprise modifying an existing action definition.

Preferably, the step of determining whether the action is available further comprises retrieving one or more action definitions that are recommended by a learning data model in response the execution of analytic queries, the learning data model dynamically modelling the relationship between data produced by the analytic engine and one or more action definitions.

The method may further comprise recording the action selected by the entity in the presence of the data produced by the analytic engine; determining the outcome of the selected action; and collating the information from the recording and determining steps to update the learning data model.

Preferably, the entity is a user or an agent and the method further comprises providing a graphical user interface, wherein an available action may be selected by the user using said interface; or providing an agent interface wherein an available action may be automatically selected by the agent using said interface.

The invention effectively codifies what actions a user should take in a set of given circumstances, reducing the need for experienced staff and/or expensive training programmes. The invention enables consistent activity patterns to be implemented and reused in a variety of contexts.

BRIEF DESCRIPTION OF THE DRAWINGS

Embodiments of the present invention will now be described and contrasted with known examples with reference to the accompanying drawings, in which.

DETAILED DESCRIPTION OF THE INVENTION

Figure 1:
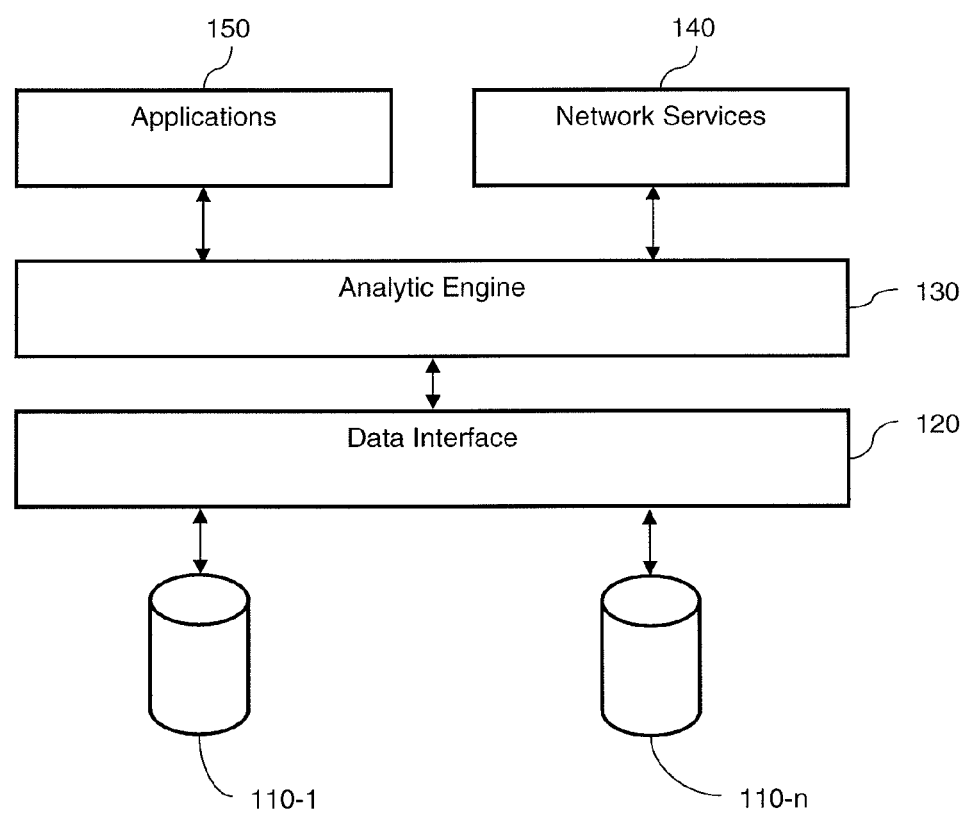
FIG. 1 is a schematic diagram of the components associated with a business intelligence application.

FIG. 1 illustrates the components that interact to provide a business intelligence application. Data is stored in one or more data sources: 110-1 to 110-*n*. Data is read from and written to these data sources 110 using data interface 120. The data sources may individually or collectively define a data warehouse. Data interface 120 provides data integration and a common interface for analytic engine 130. Data interface 120 typically provides the control routines that allow access to the one or more possibly heterogeneous data sources 110. Even though data interface 120 is illustrated as a single component it may be implemented by multiple data interfaces, wherein a particular data interface is adapted to access a particular data source or sources.

Analytic engine 130 provides data analysis and reporting functions, including, but not limited to, data analysis, data mining, data search, reporting, performance measures, accounting, and charting. In use, analytic engine 130 performs one or more analytic queries, i.e. queries on data within data sources 110. Data sources 110 typically store business data, e.g. data relating to sales, services, production, employees, products etc. Analytic engine 130 may be coupled to a user interface to display processed data from data sources 110 to a user. The analytic engine 130 may be coupled to data processing and reporting agents via appropriate interfaces. The analytic engine 130 may be adapted to produce reports, scorecards, performance measures such as key performance indicators and dashboards. These items may comprise artifacts that output processed data, for example charts or columns, and may either be displayed to a user via a user interface or may be embedded within emails, web pages, mobile device messages, and desktop publishing applications such as word processing documents, presentations or spreadsheets. The analytic engine 130 may also communicate with one or more network services 140 or one or more applications 150. The network services 140 and applications 150 may be supplied by a third party and may perform further processing of data or provide data to the analytic engine 130 to complement the processing of data from data sources 110.

Figure 2:
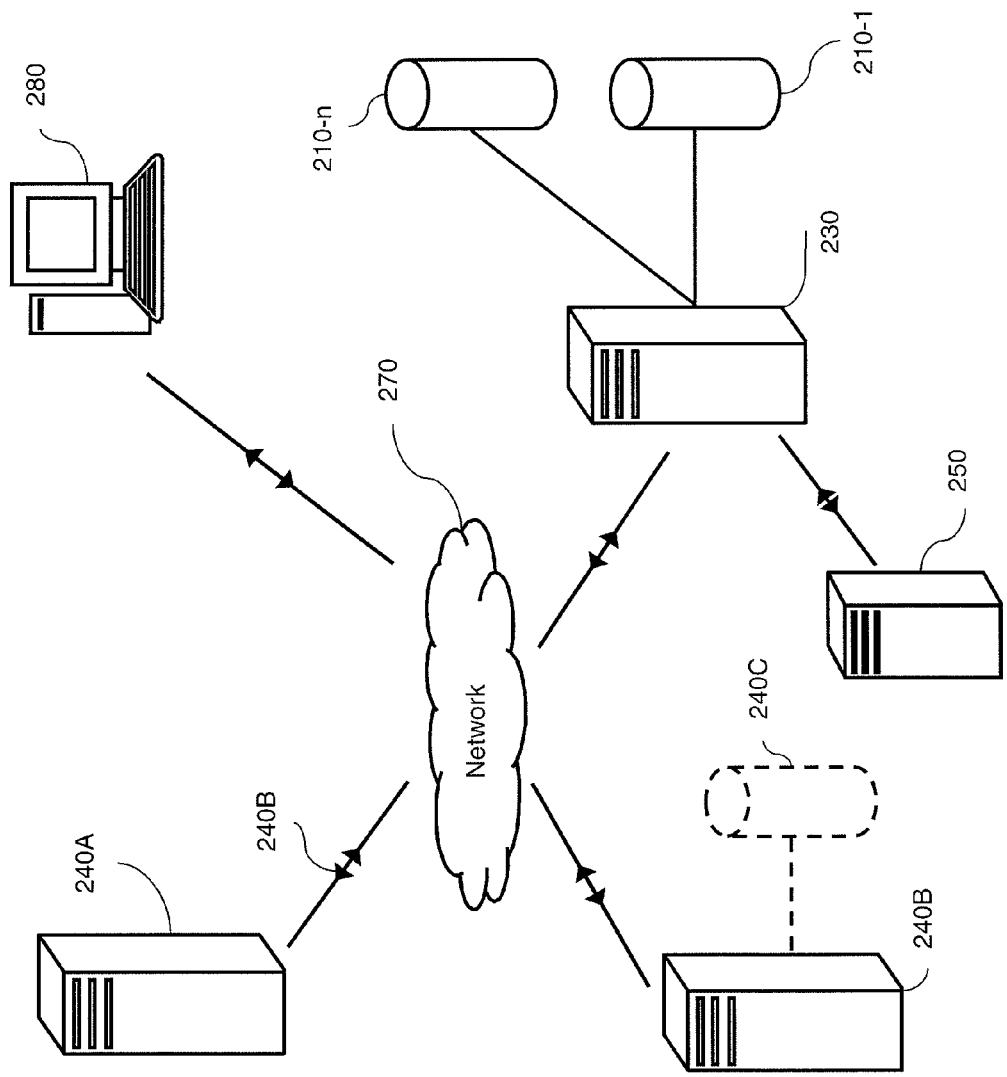
FIG. 2 is an illustration of a network through which the business intelligence application interacts.

FIG. 2 shows an exemplary network arrangement over which the business intelligence application may communicate. The components shown in FIG. 2 represent a necessary simplification of an actual network arrangement in order to clearly explain the operation of the present invention. Hence, such an arrangement should not be seen as limiting and the skilled person would understand that any known network topology with any number of devices may be used.

FIG. 2 shows a server computer 230 that may be used to implement the business intelligence application, i.e. one or more of the components illustrated in FIG. 1. Server computer 230 may comprise any known computer architecture. Server computer 230 is connected to two databases 210-1 and 210-*n* that implement data sources 110. Server computer 230 comprises a processor that processes computer program code stored in memory to implement analytic engine 130 and, preferably, data interface 120.

Server computer 230 is connected to an application server 250. The application server 250 implements application(s) 150. FIG. 2 shows one possible configuration for illustration only and the skilled person would understand that, in alternative configurations, both the analytic engine 130 and application(s) 150 may be deployed on the same computer (e.g. server computer 230 or application server 250). Server computer 230 is also connected to a central network 270 by a communications channel to access network service(s) 140. Central network 270 may comprise any network arrangement known within the art, including a local area network (LAN), a wide area network (WAN), or a combination of different network types, such as an intranet or the Internet. Such a network may comprise any number of gateways, bridges or routers and may operate according to any known protocol, with wired and/or wireless communication between nodes. The communication channels may be wired and/or wireless, implemented by any suitable physical layer device, and may implement a security layer using encryption standards known in the art. Connected to the network 270 are two further third-party server computers 240A and 240B. In this example, these third-party server computers implement two respective network services 140. Third-party server computer 240B may be optionally connected to database 240C; hence, the network service 140 provided by third-party server computer 240B may provide third-party data to server computer 230 for use by analytic engine 130. Also connected to network 270 is client device 280, which may remotely access server computer 230 in order to view data provided by analytic engine 130.

Figure 3A:
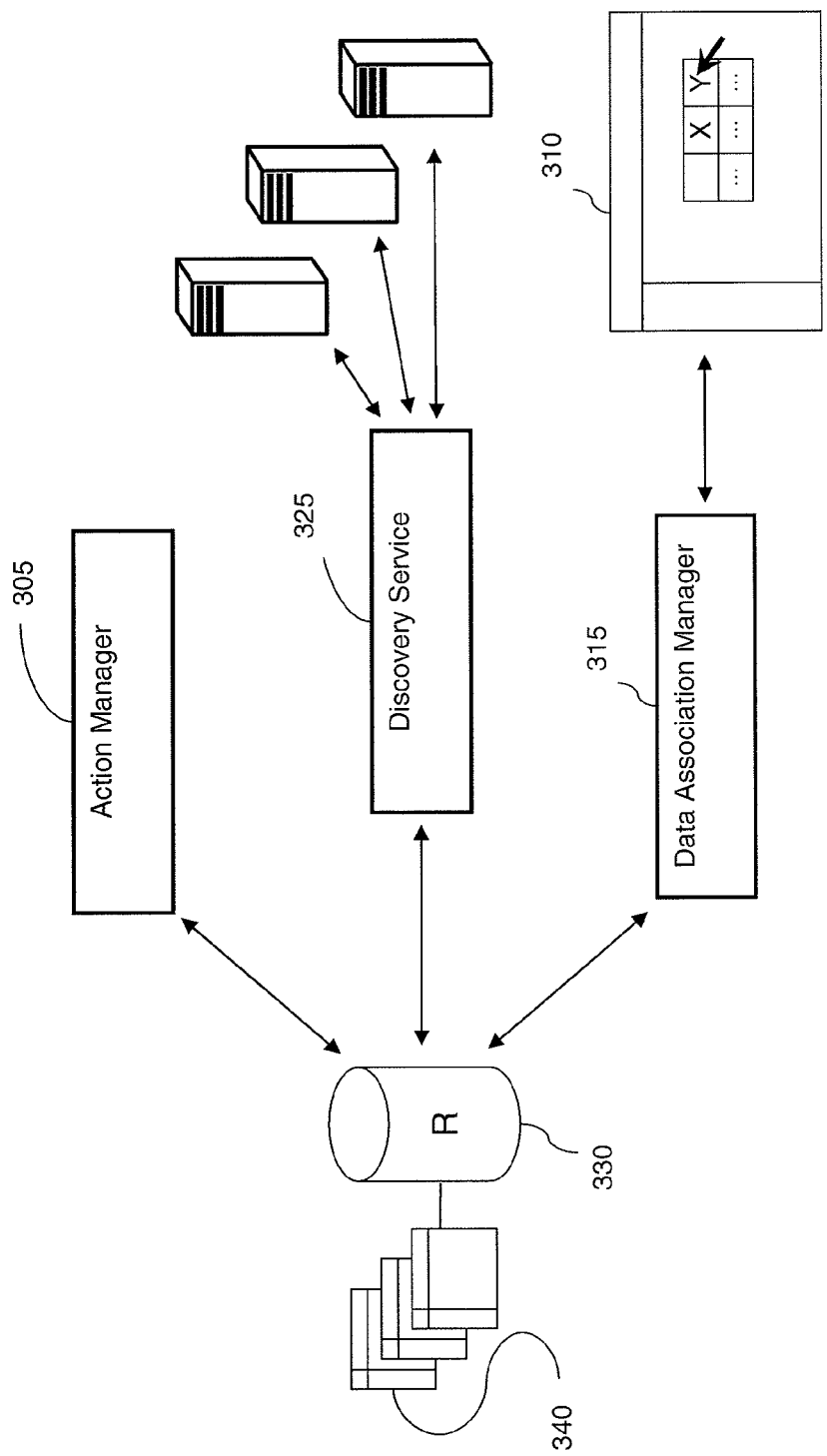
FIGS. 3A and 3B respectively illustrate components that are used to define and implement an action according to a first embodiment.

FIG. 3A shows a number of system components that interact to define an action. First, an action manager 305 is provided for use in defining an action, i.e. for use in creating, modifying and/or deleting an action definition. Action manager 305 interfaces with repository 330. The repository 330 stores one or more action definitions 340 to respectively represent one or more actions. The repository 330 may be implemented using any known magnetic or solid state memory device, for example, a hard-disk-drive, a solid-state-drive, or computer memory. As discussed previously, an action, in the context of the present invention, may be a sequence of one or more computer-implemented operations that are initiated when particular analytic data is observed. Actions may be selected by a user or an automated agent. Each action has a target that is invoked, wherein the target may comprise heterogeneous computer processes, services and workflows.

Each action definition is based on a metadata model, which provides a framework for defining actions and common mechanisms for the retrieval of metadata associated with a defined action. In use the action manager 305 makes use of this metadata model to generate an action definition. In a preferred embodiment, the metadata model is implemented using XML definitions and the action manager 305 is implemented using Java and C++ program code, however, the skilled person would understand that these technologies are not limiting and that similar functionality may be provided by alternative data definition and/or programming languages. The action manager 305 instantiates an action definition using the XML definitions i.e. generates an XML file based on said definitions, which is stored in the repository 330. In alternative embodiments, any suitable data object with associated metadata may be used in place of the XML file. The action definition 340 is stored using standard file system semantics; in such a case the required parameters to access an action definition include the name of the XML file and its associated file path. In practice, any storage system that is configurable to store a representation of an action may alternatively be used.

In a preferred embodiment, metadata is retrieved from the action definition 340 in the repository 330 using the action manager 305. Once retrieved the metadata may be modified. The skilled person would also be aware that different programming languages and/or access protocols, including web services, could be used to achieve the same functionality.

Each action definition 340 that is stored in the repository 330 can be associated with data produced by the analytic engine 130 following the execution of one or more analytic queries. In the example of FIG. 3A such association is achieved using data association manager 315. Data association manager 315 enables a relationship to be defined between artifacts and one or more action definitions. The artifacts may output data in or in the form of, for example, reports, metrics such as key performance indicators (KPIs), Scorecard Objectives, Dashboards etc. Certain artifacts may be based on other artifacts, for example, graphical output such as charts or graphs may be based on initially defined reports or metrics.

In FIG. 3A a report design screen 310 is illustrated. The report design screen 310 shows two example columns "X" and "Y". These columns represent analytic queries to be performed by the analytic engine 130 when the report is displayed. For example, column "X" may represent a query to retrieve one or more rows of product identifiers that fulfil a first set of criteria and column "Y" may represent a query to retrieve corresponding sales figures for each retrieved product identifier. When the report is displayed to a user the queries are performed on the underlying data sources 110 and the rows of the columns are accordingly populated. An action definition may then be associated with one of the columns, such that when the report is displayed to the user and the column is populated with data, the user may interact with the data in the column, for example, clicking a right mouse button, to view an action corresponding to an associated action definition. The user can then select the action by clicking on it, as described later with regard to FIGS. 6A and B.

Associating an action definition in this manner enables re-use. For example, one particular action could be linked with, and selected from, both a report and a KPI by simply associating the action definition with each of an artifact in the report and the KPI. The association may take place during the design of both the report and the KPI. In this case the association is performed by the artifact author or content author. In the past, the required processes encapsulated by an action definition would need to be coded separately into each of the report and the KPI, duplicating effort.

When an action definition 340 is associated with data produced by the analytic engine 130, for example in the form of an artifact, the relationship produced using the data association manager 315 may also define how such data is to be propagated to the target set out within the action definition 340. This may be based on partial information stored within the action definition 340 during generation. For example, the action definition 340 may provide a mapping template that is instantiated when defining the relationship. The relationship may also be stored in XML format within the repository 330.

For example, an action definition could define a "product lookup" action that returned a web page showing a product. In this case, the target may require a product identifier and so the action definition may contain an action parameter "product_identifier" to be propagated to the target. This action parameter may optionally be described as "Product ID" for ease of reference. When the action definition is associated with data produced by the analytic engine 130, in this case, column "X" as described above, the relationship defined by the data association manager 315 may specify that the "product_identifier" to be propagated to the target should equal the product identifier set out in the column. Hence, when a report is displayed, and the action corresponding to the action definition is selected for a particular cell of the column, the product identifier in that cell is propagated to the target. This results in the user being presented with the web page for the product identified by the product identifier, i.e. the function defined by the target returns the data that comprises the web page.

In other cases, the relationship may be more complex. For example, if column "X" displayed the name of a product instead of the product identifier, then a mapping between the product name and identifier would be required. This mapping may be defined in whole or in part when generating the action definition using action manager 305 and/or when defining the relationship using data association manager 315. In this example, the mapping may comprise defining a query based on the displayed product name to retrieve the product identifier. Alternatively, data from another column returned by the query may be mapped to the action parameter. This second column may be defined by a formula or logical expression which is evaluated at runtime by the analytic engine.

An action definition 340 may also be indirectly associated with data produced by the analytic engine 130. For example, the data to be propagated as action parameters need not be restricted to the data that is visible in the columns of a report; if three columns are queried in an underlying analytic query, but only two of those columns are visible in a report, data from the third column may still be propagated to the target as part of the action parameters.

Each distinct artifact that uses an action can map elements from its own data context to one or more action parameters and hence through to the target of the action when the action is selected. In this way an action becomes re-useable and easier to maintain.

The relationship defined by the data association manager 315 may also be conditional. When associating an action definition 340 with data or an artifact, conditions may be applied as to when the action is available to be selected. These conditions may be based on data generated by the analytic engine 130 and/or session information such as the current user, e.g. their role and permissions, or the present date, time or location. For example, it may be necessary to restrict the "Product Lookup" action to a particular group of users. When associating the action definition, a conditional rule such as "group($current_user)=group1", wherein "group(N)" is a function that returns the group of user "N", "$current_user" is a session variable identifying the current user and "group1" is the name of the desired group. Alternatively, it may be necessary to only show an "Increase Production" action for products below a unit price "P", in this case the conditional rule may require a look-up operation on the unit price of the product name or identifier displayed by an artifact in order to determine whether the retrieved unit price is below price "P".

FIG. 3A also shows a discovery service 325. A discovery service provides a user interface (UI) and back-end processing that allows a user to browse for suitable targets to create an action against, i.e. suitable external systems to invoke. In one embodiment, a list of targets may be provided by one or more directories, for example, XML directories hosted by one or third-party server computers 240. Once a target is selected, the discovery service may inspect the target in order to parameterise the inputs expected by that target and display these parameters when generating an action definition 340 using the action manager 305, i.e. may automatically generate, in whole or part, the action definition 340 and its associated metadata. The discovery service may also automatically set any mapping required from the data produced by the analytic engine 130 or may allow the user to set such a mapping manually.

In an example implementation, some types of action target may not support discovery services. For example, actions to invoke web services, navigate to other BI content, invoke scripts on a web-browser and invoke Java methods may support browsing for targets and may inspect action parameters whereas actions to navigate to web pages may not support discovery services.

The discovery service may also require security credentials in order to browse for action targets and inspect them. The discovery service may be adapted to recognise the security policy required by a library of possible action targets and pass the relevant credentials to that library when browsing and inspecting. These credentials may be defined as part of the present system.

As well as discovery services other services may optionally be adapted to interface with the repository 330 to access action definitions 340 and/or relationship definitions stored by data association manager 315. For example, a first service may list all actions that are to be displayed in response to particular analytic queries or, in one case, all actions that are associated with a particular artifact; actions may then be added or removed from the list. A second service may allow data for specific actions to be created, edited or deleted; i.e. the second service may provide an interface for modifying action definitions 340. Alternatively, a third service may provide a tool for modifying how an action is displayed as a UI component, i.e. setting display metadata. In certain embodiments all three services may be provided by a common service.

Figure 3B:
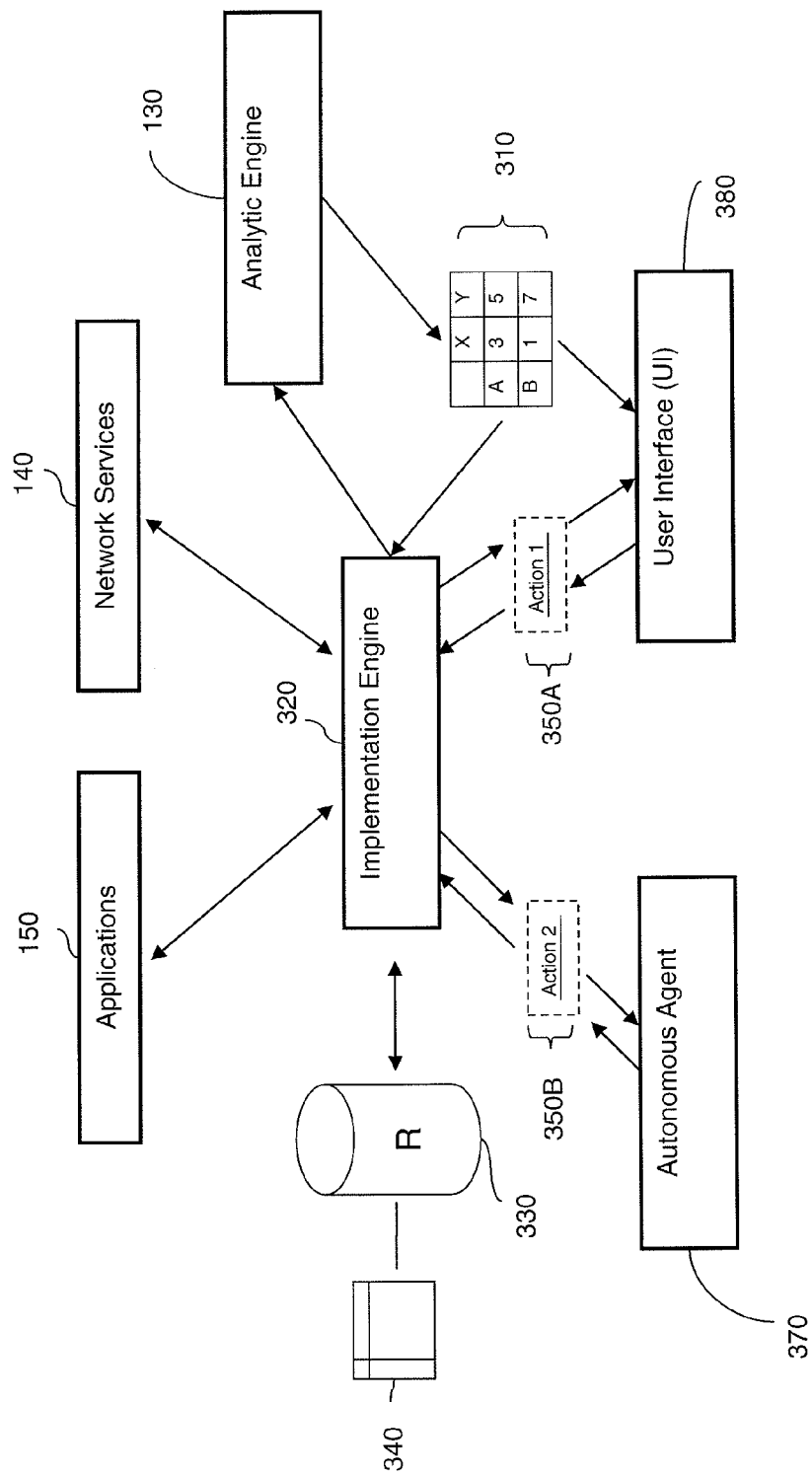

FIG. 3B shows a number of system components that interact to implement an action once it has been defined using the components of FIG. 3A.

In FIG. 3B analytic engine 130 provides processed data 310. Processed data 310 comprises the result of one or more analytic queries performed by the analytic engine 130; for example, it may comprise performance indicators calculated by processing data originating within data sources 110 or may be a subset of data stored by data sources 110 produced by running a query or report. In any case the data 310 comprises the output of analytic queries, i.e. queries performed by analytic engine 130 on data sources 110. The processed data 310 is provided to a user interface (UI) 380 that appropriately formats and renders the data 310 for display to a user. In the example of FIG. 3B, processed data 310 comprises a populated version of the report 310 in FIG. 3A.

FIG. 3B also shows an implementation engine 320 for processing an action definition 340. The implementation engine 320 interfaces with repository 330 to access an action definition 340. In the present example, when the analytic engine 130 executes a query or generates a report it invokes the data association manager 315, which preferably forms part of the implementation engine 320, and/or the defined relationships are inspected to determine whether any action definitions 340 are associated with any artifacts, queries or result set data within the report. If there are associated action definitions 340, any conditions defined within the relationship are evaluated, to determine whether the actions corresponding to the action definitions 340 are available to the user. If one or more actions are available, the graphical components of each action may be prepared for rendering upon the UI based on metadata within the appropriate action definition 340.

For example, a report may be designed to display to users of the system the results of a query performed by the analytic engine 130 in graphical format. This graphical format may comprise a bar chart with a series of columns, each column representing a value from a series. An example of such a format is provided by bar chart 610B in FIG. 6A. Actions may then be assigned to the columns within the report when designing the report, subject to certain data conditions being met, for instance, when a value illustrated by the column exceeds a certain threshold. When a user of the system views the report, should the condition be met within the current data context, a graphical representation, for example a UI box, would be displayed to indicate to the user that they can invoke an action on a remote service using the data available in the report.

A user navigating UI 380 may also trigger an event to provide an action for selection in the manner specified above. For example, activation of a UI component by mouse click may send a signal to implementation engine 320 representative of selection of a particular artifact. Implementation engine 320 may then use the received signal to determine which actions to display based on any relationship defined by the data association manager 315 for the artifact.

Once displayed as available, an action may be selected by user interaction, for example clicking a mouse button on a UI component representative of an action. On selection, the implementation engine 320 retrieves the action definition 340 for the chosen action from the repository 330 to produce an action execution request based on metadata defined in the action definition. The action execution request is used to invoke the target and perform the action; for example, the action execution request may comprise a completed URL or function call.

To produce the action execution request the implementation engine 320 examines the definitions of each action parameter set out within the action definition. Where a default value has been pre-defined, this value will be inserted directly into the action execution request to be sent to the target. Where parameter mapping has been defined, the implementation engine 320 retrieves an input value from the current data, applies any mapping and inserts the result into the action execution request. In some instances, some of the action parameters may not have any predefined values or mappings and in this instance the implementation engine 320 will prompt the user to supply information for these fields. Once all required parameters have had values assigned via one of the three methods described above, the implementation engine 320 then uses the completed action execution request to invoke the target.

Implementing an action may involve communicating with targets in the form of network service(s) 240 or application(s) 250. For example, a target may be defined by a URL. In this case, the action definition would contain a template of the URL with action parameters in the form of placeholders within the URL template into which values are inserted on selection of the action. Alternatively, the target of an action may comprise a web service, in which case a sample template of a Simple Object Access Protocol (SOAP) message with placeholder values is stored as part of the action definition. These placeholders are replaced by values retrieved from processed data 310, session information or user input to construct an actual instance of a SOAP message which is then be sent to the web-service end point stored within the action definition and so used to invoke the target web-service. Where the target to be invoked is an Enterprise JavaBean (EJB), the action definition contains information on the action parameters defined as part of the EJB definition and the Java Naming and Directory Interface (JNDI) URL where the EJB is invoked. On invocation, the implementation engine 320 uses standard Java Enterprise Edition (EE) mechanisms to look up and invoke the EJB, substituting values for the parameters defined in the action definition.

Actions may also be presented to, and invoked by, autonomous agents 370. In FIG. 3B, information 350B representing one or more actions may be provided to agent 370. Actions are assigned to agents when the agent is created and/or edited, preferably using data association manager 315. The action may run wholly independently of the agent or may require interaction and/or data from the agent. The agent 370 may select an action based on logic or conditions expressed within the agent and send a signal to implementation engine 320 to invoke the action. It should be noted that in contrast to actions which may be selected by users, actions which may be selected and invoked by agents must be able to supply values for all required parameters either from defaults or from processed data 310, session information etc as agents are run "headless"—i.e. at the time that an agent is run, there is no user to prompt for required information.

The actions that are available for selection by an agent may be determined in a similar manner to that discussed above. However, when an agent is used there is no need to display data; hence analytic queries may be run without a user's knowledge to provide processed data. Likewise, artifacts may be generated but not rendered for display. The agent may then programmatically access such data or artifacts. Elements of this data can also be mapped to action parameters in the same way as data is mapped for actions associated with artifacts displayed in a UI. Agents are also able to map session variables since agents can effectively impersonate a user profile. In certain embodiments, agents may automate the selection of actions. For example, an agent may programmatically select the same action on each row of data in a report.

Figure 4:
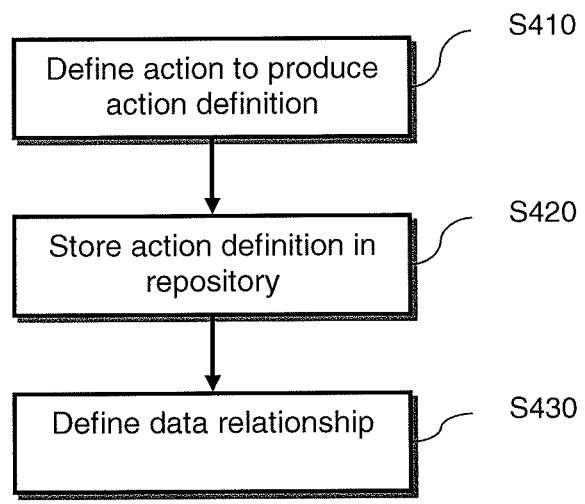
FIG. 4 illustrates an exemplary process for defining an action.

FIG. 4 shows a method for defining an action. In step S410 an action is defined using the action manager 305 to generate an action definition. An action may be defined by a user of the business intelligence application using a graphical user interface (GUI) provided as part of the action manager 305. Due to the framework of the metadata model and the supplied GUI, the user does not require advanced technical skills. One or more discovery services may also be used as described above to simplify selection of a suitable target and the definition of the required action parameters; for example, if the action type is supported by a discovery service, an additional UI may be presented to a user so that they can browse and select an appropriate target process, function, service or link to create an action against. In this step, default values for action parameters may be set together with metadata defining how the action is to be presented. At step S420 the action definition is stored. Once the action has been defined, a user may select and invoke an action based on the action definition 340. In step S430, the data association manager 315 is used to define a relationship between data produced by the analytic engine 130 in response to analytic queries and the action definition stored in step S420. A condition may also be defined that involves the data, for example, the condition may be that data in a column or row exceeds a certain threshold and the user viewing the data has "managerial" permissions. The latter variable may be defined by the content of session variables at the time of viewing.

Figure 5:
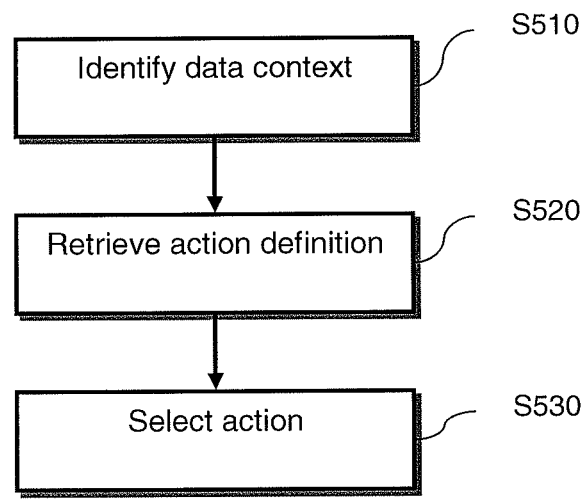
FIG. 5 illustrates an exemplary process for selecting an action.

A method of selecting an action is shown in FIG. 5. At step S10 the data context is identified. This may involve identifying a report that has been shown to a user and determining whether a valid data or business condition has been reached. Based on the data context one or more suitable action definitions are retrieved from the repository at step S520. The one or more actions that are available are then displayed to the user using any presentation or representation metadata defined within the relevant action definition. The user then selects a particular action from those displayed. This is shown in step S530. The action definition associated with the selected action is then processed by the implementation engine 320 and target, i.e. a function, process, or service, including navigation to a location, is invoked based on the variables and metadata within the action definition. This typically involves propagating data from the data context, i.e. performing any required mapping or transformation to convert data extracted from the data context to action parameters required for the target. This step may also comprise providing a suitable UI to the user to allow them to enter any user data required for the action parameters.

The present invention allows for the definition of two principal types of action. The first type of action enables navigation to a report or external system such as application 250.

The second type of action enables the invocation of a process, function, service or event on an external system, such as network service 240. An action definition for both types of action is generated based upon one or more semantics. Semantics may be defined as part of the metadata model, e.g. in terms of XML definitions. The data that instantiates the XML definitions may be predefined or set manually when defining an action. Semantics are interpreted by the action manager 305.

The semantics provide a framework for a detailed conceptual model of an action. They may provide for a user's end view of an action to be stored as part of the action definition, i.e. a textual, and, if required, graphical, representation of an action including a name, description and interaction metadata determining how an end user or agent interacts with the action. For example, the interaction metadata may comprise: a variable that determines whether to request confirmation before invoking a target; variables that determine how to present result values; definitions of possible error messages and/or error handling procedures; the text to appear on user interface components (buttons, dialogs, etc.); and/or a Uniform Resource Identifier (URI), such as a Uniform Resource Locator (URL), linking to local or remote help and support information for the action. The semantics may also require the mapping of data produced by analytic queries and will always require an underlying functional end point as a target. However, this does not preclude embodiments wherein the functional end point is generated dynamically, for example at the time of invocation. A functional end point may include web service end points, remote procedure call addresses, methods and functions of application code, application programming interfaces (APIs), and/or network addresses (e.g. URLs). For example, methods may be implemented in Java and functions may be implemented in Javascript.

The semantics for both types of action may comprise:

Physical Mapping: this metadata describes the target for a given action, for example, if the action involves navigation to a report, the location of the report and optionally the application required to view it; if the action involves the invocation of a service, the network address of the service.

Business or User Representation: this metadata defines an action in terms of a vocabulary that is accessible to a non-technical audience. This representation is used to describe the name of an action and/or the name of parameters associated with the action.

Action Parameter Semantics: define how data, in the form of, for example: literal values, data from analytic queries, and/or data from the end user or agent, should be mapped onto one or more values for action parameters, i.e. parameters in the service or function that the action invokes or navigates to. The action parameter semantics may also determine the level of visibility of action parameters for a non-technical end user; for example whether users should be prompted for the action parameters (or values to be mapped to action parameters) and whether particular action parameters are optional or mandatory.

Presentation Rules: this metadata defines how an action should be presented to a user when the action is available and/or selected. It may also define rules describing the expected behaviour of an action selection and target invocation, for example: what UI components are presented to a user after selection of an action, whether confirmation of the action selection is required and options determining how the results of action invocations should be rendered on UI 380. Typically, presentation rules are associated with a particular action definition; however, there may also be more general rules, defined as part of the metadata model but not linked to any particular action definition. These general rules may determine how actions are displayed before selection.

Security parameters: Action definitions that are stored in the repository 330 may optionally be secured using an access control list (ACL) mechanism to determine which users and defined user roles may invoke, edit and delete an action. The target of the action may also have a security policy applied to it; for example, a target web service may require a user ID and password in the incoming SOAP header or it may require a Security Assertion Markup Language (SAML) token. If this is the case, when invoking an action, the implementation engine 320 is adapted to recognise the security policy on the target and send appropriate credentials to the target. These credentials may be set based on a known account or the user who selects the action and maybe stored statically in the action definition or set dynamically at the time of selection based on session parameters.

When an action is defined, some parameters may be marked as required and some as optional. When an action is selected and a target invoked, all required parameters must have values assigned in one of the following ways: by default, using values defined in the action definition, by user entry at the time of selection or by assignment from values within the data context. In contrast, parameters marked as optional within the action definition need not have values assigned for the target to be invoked. So, for example, an action may have a target in the form of a web service. The action definition that defines the action may set out five parameters (i.e. pieces of information) that may be passed to it. These parameters may be defined using XML fields or tags. Of these five parameters, four may be required, while the fifth need not be supplied for the service to function. In some instances this will be apparent from the web service definition, e.g. in the web service definition the web service parameter may be marked as optional. Alternatively, in other instances, the user defining the action may have knowledge of the target service and so may be able to manually set a parameter as optional. The ability to define parameters as optional or required allows a user defining an action to ensure that all required information is submitted while retaining the flexibility of leaving some fields blank if this desired by the end user of the action. By allowing default values of the action parameters to be set in the action definition the quantity of data required from the data context or user may be reduced. For example, in the above case, default values for three of the four mandatory parameters may be set in the action definition; the value for the fourth parameter may then be passed from the data context or user.

Figure 6A:
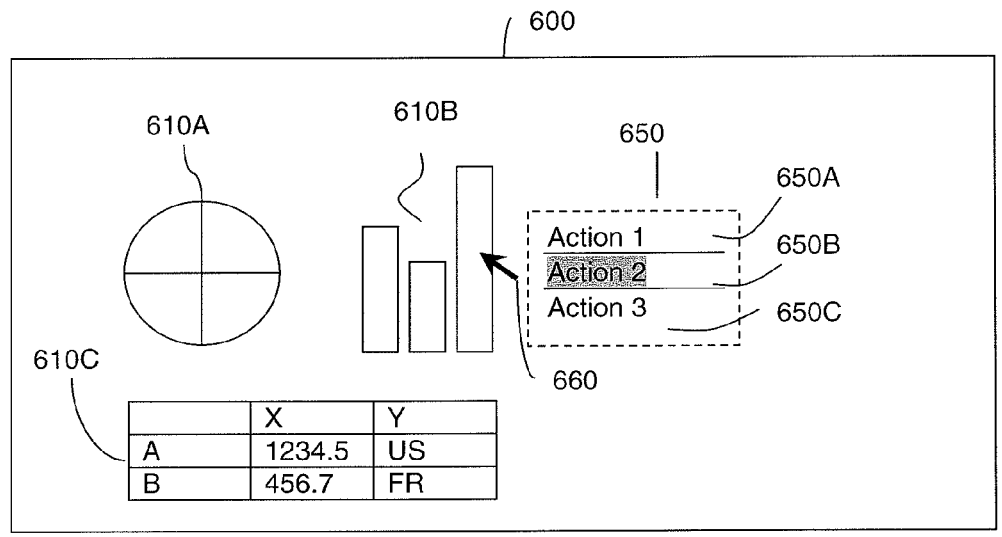
FIGS. 6A and 6B are examples of a user interface in which actions are presented to a user.

FIGS. 6A, 7A and 6B, 7B show examples of a user interface 600 during the implementation of the method of FIG. 5. User interface 600 may be generated in whole or in part by UI 380. In user interface 600, various reports and indicators are provided. For example, there is pie chart 610A, bar chart 610B and data table 610C. A user operating user interface 600, for example on client device 280, may select any of these elements using cursor 660. When a user selects an element such as a bar chart 610B as shown in FIG. 6A and, for example, clicks a right mouse button, a list of pre-defined actions for the user to choose from is displayed (650). This is typically achieved by looking up all actions associated with the artifact or object that the user has selected with the cursor and determining whether any conditions associated with the retrieved actions are met based on the data displayed by the artifact the user has clicked on.

Once an action is selected for display, the implementation engine retrieves the appropriate metadata from the action definition 350A from the metadata repository 330, and this data is sent to the UI 380 to render the appropriate UI components for the action. In the present example, the appropriate actions are displayed in user interface box 650. For example, in FIG. 6A three actions are displayed: "Action 1"—650A, "Action 2"—650B and "Action 3"—650C. In actual implementations, instead of the text "Action X", a short description of the action may be provided, for example "Lookup Sales Lead", "Link to Report", "Raise Forecast", or "Drill Down". FIG. 3 shows the information 350A transferred for "Action 1" 650A.

Figure 7A:
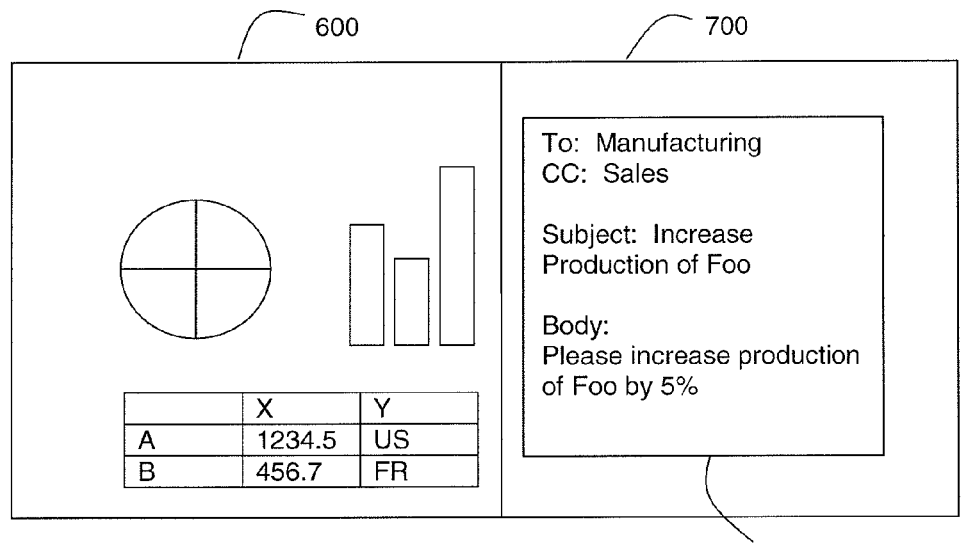
FIGS. 7A and 7B demonstrate the exemplary results of selected actions.

In the example of FIGS. 6A and 7A, the user selects "Action 2" 650B by clicking on it with cursor 660. This action has previously been associated with the artifact being clicked using data association manager 315. At design time, the action definition for the action will have parameterised the inputs required by the target functionality, e.g. in the form of action parameters. When the user clicks the action, data from the report artifact clicked is mapped to action parameters in the action definition using the Action Parameter Semantics so that the target is invoked with the appropriate context-driven action parameter values. The implementation engine 320 may at this point provide the user with a UI to finalise values mapped to action parameters prior to the implementation engine 320 invoking the target. FIG. 7A shows the results of this action being selected.

In this case, the action definition for "Action 2" defines a command to increase production of a particular product by sending an appropriate email. Hence, a user interface component 710 is loaded and displayed in a portion 700 of user interface 600 that allows the user to send an email to the appropriate parties to increase production by 5%. The variables included in email 710 may be populated based on the action definition and the data from the report artifact that was selected to display the action. The user interface is shown in a split-screen configuration for illustration only and is not intended to be limiting.

Figure 6B:
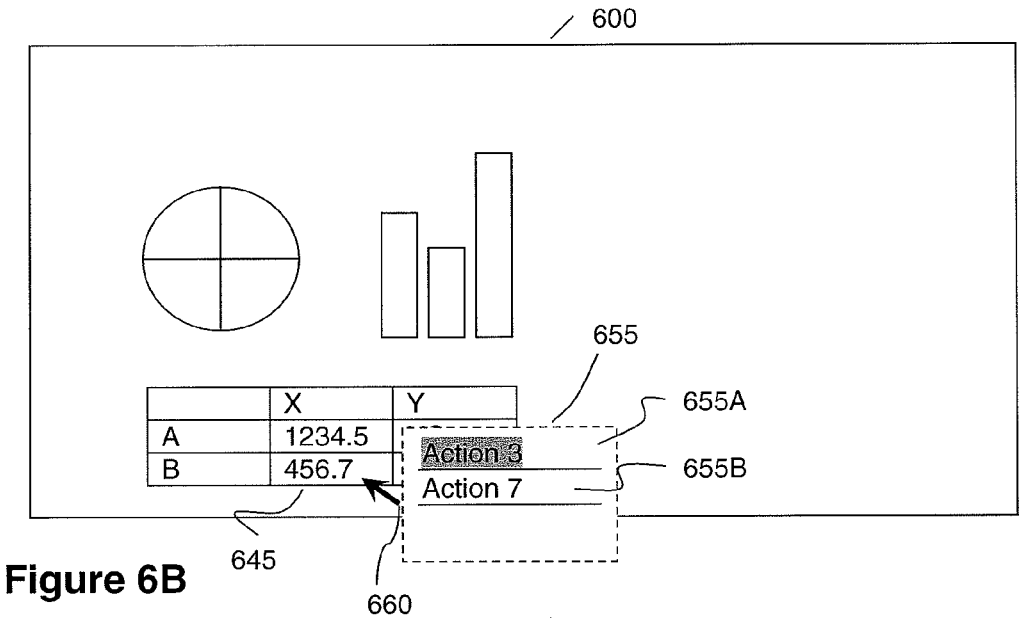
Figure 7B:
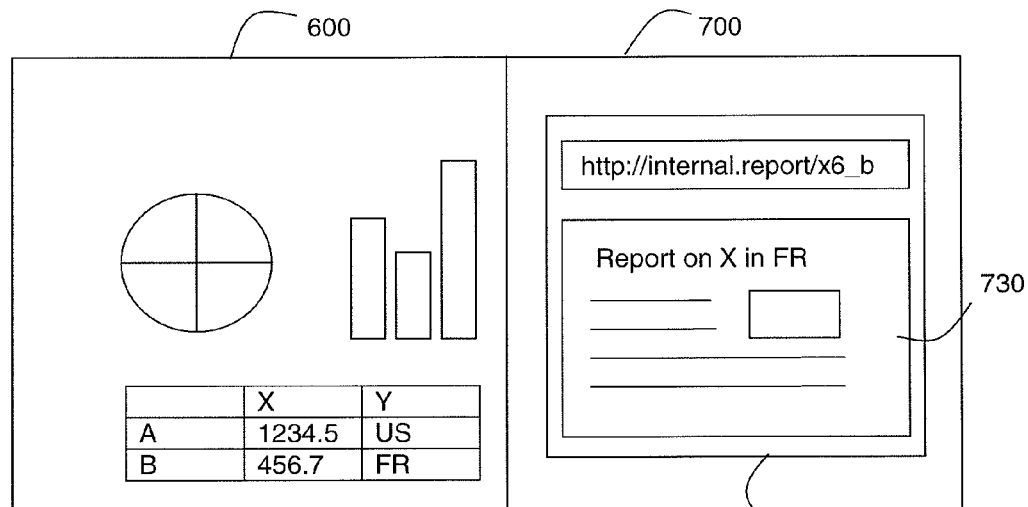

A second example is shown in FIGS. 6B and 7B. In this example, as shown in FIG. 6B, a user uses cursor 660 to select table entry 645. The table displays the results of analytic queries that are run by analytic engine 130. This table entry 645 then provides the data context, as for example described with regard to step S510. Appropriate actions for the table entry are then retrieved and displayed as discussed above based on the relationship defined for the table entry using the data association manager 315. Hence, UI box 655 is rendered and displayed to the user featuring actions based on metadata models 335 retrieved from the metadata store 330 and/or action definitions 345 retrieved from the repository 340. In this case, "Action 3"—655A and "Action 7"—655B are displayed to the user.

In the second example of FIGS. 6B and 7B, the user selects "Action 3" 655A. "Action 3" results in an appropriate report being shown to the user based on data item 645 and so the user description for "Action 3" may comprise "Link to Report". An example of "Action 3" is shown in FIG. 7B. The action definition for "Action 3" exposes the parameters needed to retrieve the report. Values from the table plus input from direct user interaction in the UI are mapped to these parameters at runtime such that a link to the target report is created and invoked. In FIG. 7B, the report 430 is displayed via a web browser 420. The report 430 displays data relating to X in France, i.e. linked to data item 645. Hence a user has immediate access to relevant data based on the table 610C.

From the examples presented above it is clear that embodiments of the present invention enable a non-technical audience to integrate heterogeneous processes, workflows, services, functions and content (e.g. websites) with business intelligence applications and content (reports, scorecards, conditions, charts, maps KPIs etc.). The embodiments of the present invention further enable re-use of actions to enable packaged integrations. For example, "Action 3" ("Link to Report") is available in both FIG. 6A and FIG. 6B. The embodiments further provide a consistent role based security model for actions and hide the complexity of integration from non-technical users. The invention enables significant improvements to the speed and agility of an organisation by enabling users to define and take action directly without intervention from technical staff, as well as reducing costs.

Figure 8:
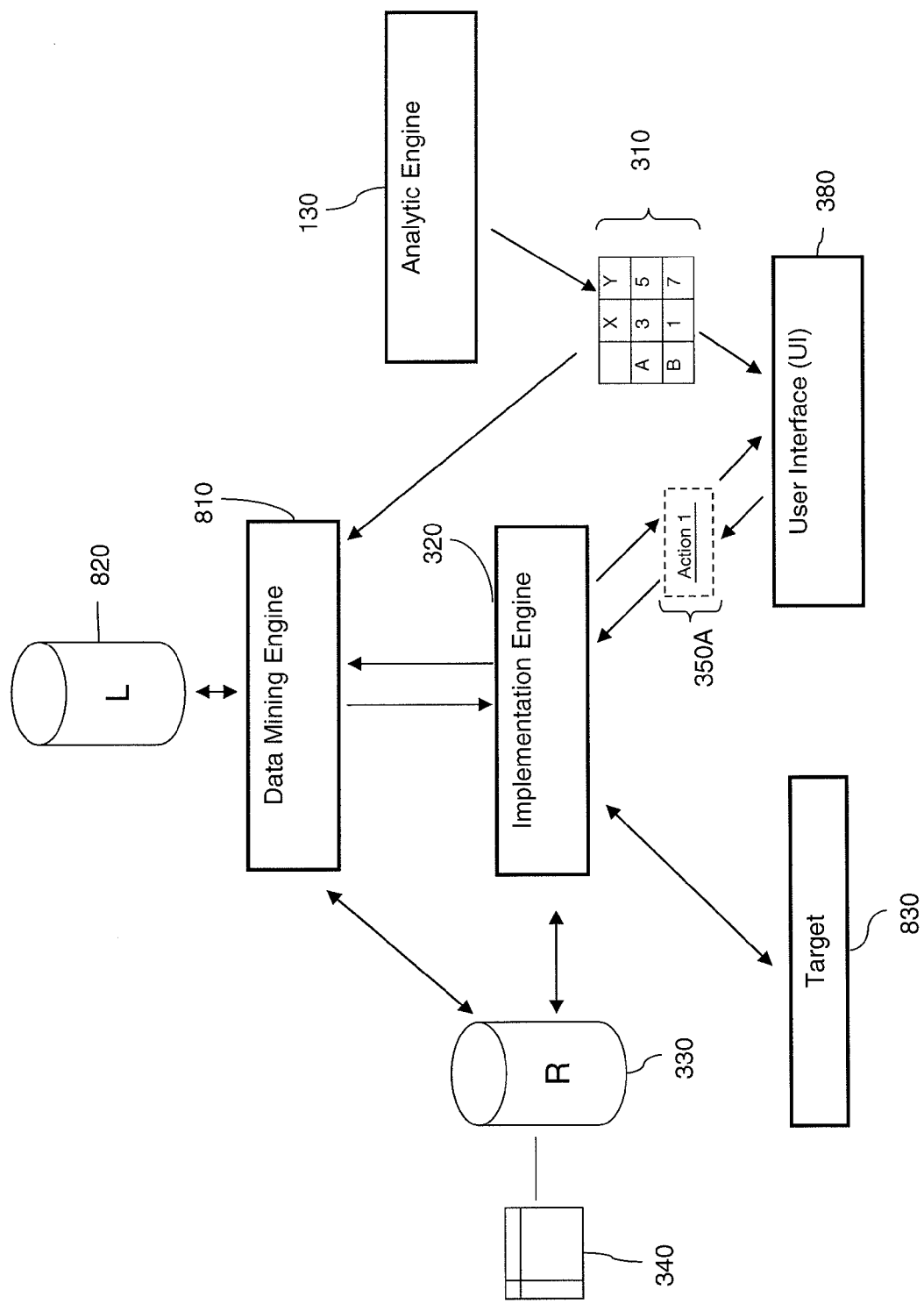
FIG. 8 is a schematic diagram of components that are used to recommend an action according to a second embodiment.
Figure 9:
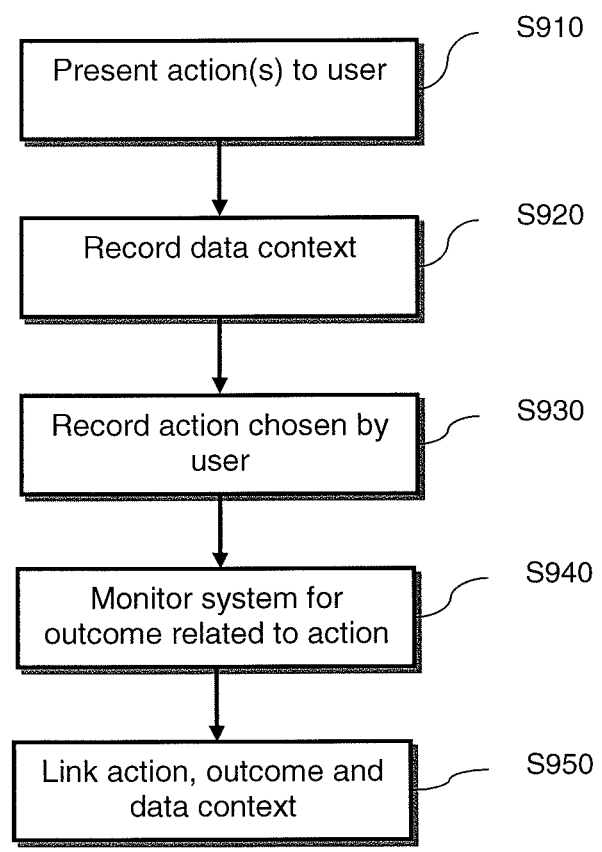
FIG. 9 illustrates an exemplary process for recommending an action.

A second embodiment of the present invention is demonstrated in FIGS. 8 and 9. This second embodiment is an optional extension of the first embodiment described above and provides a system to predict and recommend the optimal action(s) for a user to select.

FIG. 8 shows a selected number of features from FIG. 3 that interact with the system of the second embodiment. The core of the system is a data mining engine 810, which may be real-time. Data mining engine 810 is adapted to recommend a set of candidate actions to take when a user, or possibly an agent, is presented with data derived from the output of analytic engine 130.

The data mining engine 810 is coupled to implementation engine 320, repository 330 and a learning data model 820. In a preferred embodiment the data mining engine 810 is implemented using the Java programming language; however, the skilled person would understand that other programming languages may be used. Learning data model 820 is dynamically built by data mining engine 810 based on a sequence of data inputs, in this example the particular data produced by analytic queries associated with an action definition, and a sequence of associated outcomes, which may be the external processes and services the action invokes or the results returned by such processes and services. The learning data model 810 is built over time as multiple actions are selected by one or more users. The learning data model 810 builds a statistical or heuristic model that enables a complex relationship to be modelled between data produced by analytic queries, actions taken by a user or an agent, and one or more targets, in the form of a process or function to be invoked or a location to be navigated to, as defined in action definitions. This model may be built using known technologies, such as neural or Bayesian networks or other machine learning tools.

In a preferred embodiment, a "stub" action definition is used to recommend an appropriate action. The "stub" action is not bound to any particular action but instead provides an abstract action or container to which one or more actions may be dynamically assigned in response to analytic queries, for example the rendering of a report artifact. The "stub" action definition may be associated with an artifact such as a report column or a KPI as discussed in the first embodiment. At run-time the data mining engine 810 provides data representing one or more recommended action definitions to populate the "stub". The user then selects one of these dynamically assigned actions and the appropriate action definition data is loaded for invocation as in the first embodiment. A "stub" is one of several techniques for dynamically assigning an action and other techniques may alternatively be employed without departing from the scope of the invention.

The data mining engine 810 starts with a known number of actions, whose definitions map to possible external functions, processes or services that can be invoked as targets. For example, the data mining engine 810 may be adapted to scan metadata repository 330 to produce a list of selectable actions. The data mining engine 810 may also be adapted to use a subset of defined actions, the subset being defined by rules or logical expressions. The set or subset of actions available to the data mining engine 810 is known as the candidate set. These actions then form the possible output space of the learning data model 820. Every time an action is selected the implementation engine 320 informs the data mining engine 810 and this information is used to build the learning data model 820. The data context, for example the artifact and data field associated with the selected action, also provides input to the learning data model 820. The data mining engine 810 then builds a statistical or heuristic model that links the input and output.

Where a "stub" action is associated with a UI component (such as a report where the action is invoked by a user), the "stub" action is populated to present several possible actions in the UI. These possible actions are selected to be part of the "stub" action by the data mining engine 810 based on the data context and their likelihood to result in a successful outcome considering the context, as defined by the learning data model 820. A user may then select one of the possible actions.

A "successful" outcome may be parameterised using one or more goals set through the data mining engine 810. Each goal may have one or more associated metrics. For example, a goal could be to reduce costs by 10%, wherein costs may be calculated based on data in data sources 110. When an action is selected, the implementation engine 320 notifies the data mining engine 810 of the action so that the data mining engine can track whether or not a successful outcome resulted from the action being taken. For example, the data mining engine 810 may record that a particular action has been taken and schedule a query to be run a certain time after the action is selected, the query may then compute the appropriate goal metric and compare it with the goal condition. If the goal condition is met the action is deemed to be "successful" in the context of the original data context. This, for example, may be used to increase the weighting of the link between the data context and the selected action in the learning data model 820. If multiple goals are set then actions may be selected based on appropriate optimisation algorithms. For example, three goals may be: 1) increase cross-selling; 2) increase up-selling; and 3) reduce cost. Each goal may then be weighted, e.g. goals 1) and 3) having a weight of two-fifths, and goal 2) having a weight of one-fifth. The outcome of a selected action may be parameterised by the respective changes in cross-selling, up-selling and cost following the selection of the action. The data learning model 820 then records which selected actions, for a particular data context, maximise these weighted goals. In this way links are made in the learning data model 820.

The data mining engine 810 may also be configured to provide the likelihood of a successful outcome and/or information on the one or more goals considered a "success". For example, this information may be supplied to the implementation engine 320 for display to a user as part of the UI. In one specific embodiment, this information may be provided together with, or alongside, the available actions.

Alternatively, the simple selection of an action may be deemed a "successful" outcome. In the latter case, the learning data model 820 may model the most popular actions, i.e. those that are most often selected, for one or more parameters representing a particular data context, which can later be supplied by the data mining engine 810, when one or more data context parameters are met, as possible actions for selection.

The data mining engine 810 presents actions to the implementation engine 320 for selection based on the data learning model 820 where the target, the parameter mappings to the target, and the action semantics may be changed dynamically by the data mining engine 810 or the implementation engine 320, for example, by populating or instantiating the "stub" action. By evaluating historical and current results and the current data context the data mining engine 810 continuously improves and refines the list of actions presented to the implementation engine 320.

For example, if there are two possible actions: Start Sales Promotion 1 and Start Sales Promotion 2. If data analysis by the data mining engine 810 reveals that Promotion 1 is more successful in achieving a goal of higher sales revenue in Region 1, but not in Region 2, then the data mining engine will assign a higher score to Promotion 1 where the data context includes Region 1 and will present the implementation engine 320 with information to dynamically provide the action to invoke Promotion 1 if the data context includes Region 1.

In the case of an action to be selected by an agent, the implementation engine 320 will provide the action with the highest likelihood of a successful outcome as determined by the data mining engine 810 using the same mechanism described above.

FIG. 9 shows an exemplary method for recommending actions based on a data context. Although this method describes a user selecting an action, it can equally be applied to an agent selecting an action. At step S910 actions are presented to a user, for example as in FIGS. 6A and 6B. When the user selects an action, for example "Action 2" 650B in FIG. 6A, the data mining engine 810 is notified so that it can learn which actions users prefer to select for a given data context or condition. The data context or condition may be defined by the current artifact or data parameters, which may provide the input for building the learning data model 820, together with the selected action. In FIG. 8 the data context is derived by monitoring processed data 310 output by the analytic engine 130. This is shown in step S920. The selected action is then detected by the data mining engine 810 using feedback from the implementation engine 320, as shown in step S930.

In step S940 the data mining engine monitors the system for an outcome related to an action, for example, in the manner set out above. For example, the data mining engine 810 can be notified by the action implementation (a business workflow, Java method, script or web service) when the action achieves a given outcome (e.g. late payment paid, product bought, service request closed with high customer satisfaction). A selected action may be traced using a unique identifier, which may allow processes, functions and workflows to return an outcome for said action. Alternatively, the data mining engine 810 may rely on its own mechanisms for analysing data to determine an outcome. For example, the data mining 810 may execute one or more queries against a data source that can satisfy these queries and provide an indication of an outcome.

Once information representing the data context, selected action and actual outcome has been collected by the data mining engine 810, this information is linked in step S950 to enable the data mining engine to learn which actions for a given condition or data context are most likely to have successful outcomes. This maybe achieved using known statistical and machine learning approaches to build learning data model 820.

Having built learning data model 820 the data mining engine 810 is able to use the data stored therein to supply appropriate action recommendations to a user. For example, the data mining engine 810 may monitor processed data 310 output by analytic engine in order to parameterise a data context. One or more of the data parameters of the data context may then be used as input to retrieve actions with recorded successful outcomes. The recommended actions can then be supplied to the user, for example as shown in FIGS. 6A and 6B. The method of FIG. 9 is then repeated for any selected actions allowing the learning data model 820 to be continually updated in real-time, thereby continually improving the predictive capability of the system.

The second embodiment saves the cost overhead and disruption of redeveloping a business intelligence application when the rules to determine which action should be taken in response to a given business insight, condition or data state need to be changed, for example because of changing business practice or developments within the company. The embodiment also reduces the number and complexity of rules that need to be defined. The system can also adapt in real time when the rules determining the best actions to take for a given condition change, for example because market conditions or business environment changes.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

Generally, any of the functionality described in this text or illustrated in the figures can be implemented using computer-implemented processing, firmware (e.g., fixed logic circuitry), or a combination of these implementations. The terms "component", "engine" and "agent" as used herein generally represents software, firmware, or a combination of software and firmware. For instance, in the case of a software implementation, the terms "component", "engine" and "agent" may refer to program code that performs specified tasks when executed on a processing device or devices. The program code can be stored in one or more computer readable memory devices as described above. The illustrated separation of components and functionality into distinct units may reflect an actual physical grouping and allocation of such software and/or hardware, or can correspond to a conceptual allocation of different tasks performed by a single software program and/or hardware unit.

The action manager 305, data association manager 315 and/or the implementation engine 320 may comprise one or more computer-implemented processes and/or one or more computer-implemented services to create and invoke an action. A "process" may comprise computer program code that is executed by a processor to provide a particular function. A "service" may comprise a computer-implemented mechanism to enable access to one or more capabilities or functions, where the access to such capabilities or functions is provided using a prescribed interface and is exercised consistent with constraints and policies as specified by a service description. In a typical example, the action manager 305, data association manager 315 and the implementation engine 320 collectively comprise a combination of processes and services written in one or more known programming languages, for example, but not limited to, C++, Javascript and Java.

For ease of explanation, in FIGS. 3A and 3B, each of the action manager 305, data association manager 315 and the implementation engine 320 are illustrated as a component distinct from analytic engine 130, wherein the analytic engine 130 provides data analysis and reporting functions. However, one or more of the action manager 305, data association manager 315 and the implementation engine 32 may form part of the analytic engine 130, for example, may be a particular thread or sub-process within the analytic engine 130 without altering the functionality described herein.

Figure 10:
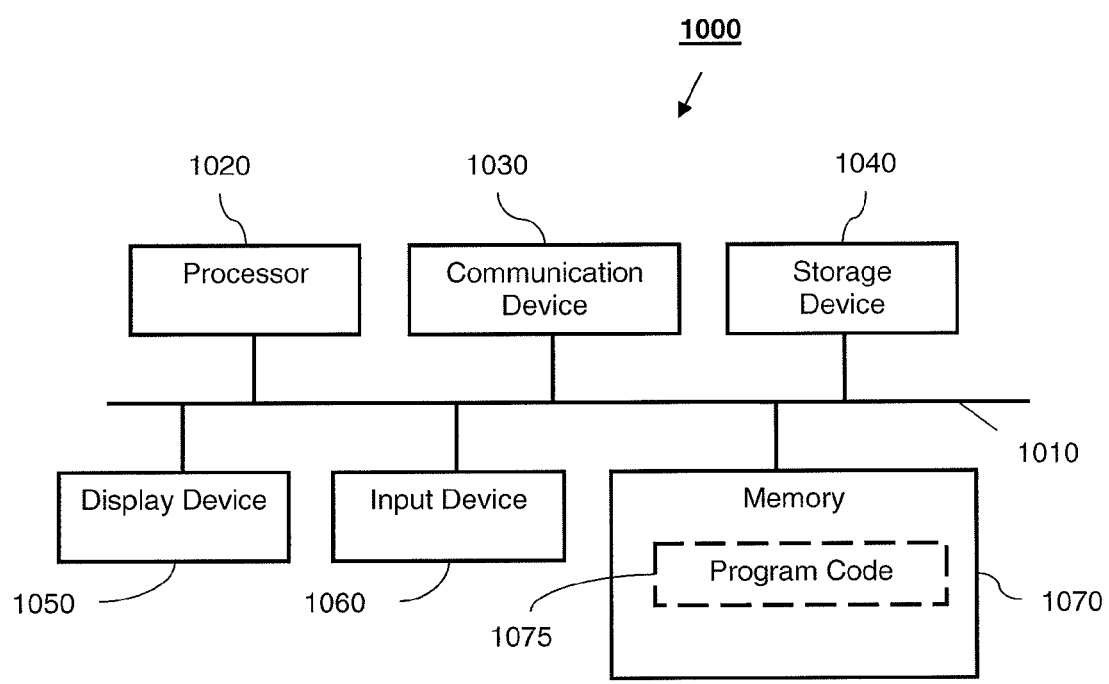
FIG. 10 is an illustration of exemplary hardware that may be used to implement the present invention.

The server computer 230 and/or the components illustrated in FIGS. 3 and 8 may be implemented using the computer system 1000 of FIG. 10. Alternatively, the systems described herein may be implemented by one or more computer systems as shown in FIG. 10. FIG. 10 is provided as an example for the purposes of explaining the invention and one skilled in the art would be aware that the components of such a system may differ depending on requirements and user preference. The computer system of FIG. 10 comprises one or more processors 1020 connected to a system bus 1010. Also connected to the system bus 1010 is working memory 1070, which may comprise any random access or read only memory (RAM/ROM), display device 1050 and input device 1060. Display device 1050 is coupled UI 380 to provide the user interface to the user. The user then interacts with the user interface 380 using input device 1060, which may comprise, amongst others known in the art, a mouse, pointer, keyboard or touch-screen. If a touch-screen is used display device 1050 and input device 1060 may comprise a single input/output device. The computer system may also optionally comprise one or more storage devices 1040 and communication device 1030, which may enable communication over a network, such as that illustrated in FIG. 2. Storage devices 1040 may be any known local or remote storage system using any form of known storage media. In use, computer program code is loaded into working memory 1070 to be processed by the one or more processors 1020. The computer program code may implement the features of FIGS. 1, 3 and/or 8.

What is claimed is:

1. A system comprising:

an action manager adapted to generate an action definition, the action definition defining an action to be selected by an entity, the action comprising the invocation of a target, the action definition comprising metadata for use in locating the target and for use in propagating one or more parameters to the target;

a repository adapted to store the action definition generated using the action manager;

a data association manager adapted for use in defining a relationship between data produced by an analytic engine through the execution of one or more analytic queries and the action definition;

an implementation engine adapted to determine whether the action is available in response the execution of analytic queries, based on the relationship defined by the data association manager, and, if available, to use the action definition to invoke the target in response to selection of the action by the entity, the invocation of the target including propagating data produced by the analytic engine into said target based on the metadata to perform the action; and a data mining engine comprising:

a selection component to record a specific action selected by an entity in the presence of specific data produced by the analytic engine;

a monitor component adapted to receive data indicative of the outcome of a selected action; and a recommendation component adapted to receive data from the selection and monitor components and produce a learning data model that dynamically models the relationship between the data produced by the analytic engine and one or more action definitions so as to recommend a set of one or more suitable actions in response to the execution of analytic queries, wherein the data mining engine is adapted to dynamically assign one or more action definitions to a stub action definition in response to the execution of one or more analytic queries, and the implementation engine is adapted to use the stub action definition after assignment to provide a set of suitable available actions.

2. The system of claim 1, wherein data association manager is adapted to define one or more conditional rules that specify when the action associated with the action definition is available, the conditional rules being based on at least one of the data produced by the analytic engine and session information for the entity.

3. The system of claim 1, further comprising
one or more discovery services adapted to inspect an external system and generate values for the metadata for use in locating the target and the parameters to be propagated to the target.

4. The system of claim 1, wherein the action manager and/or the data association manager are further adapted to generate mapping metadata that defines any data transformations that are required to transform the data produced by the analytic engine into a form suitable for the target.

5. The system of claim 1, wherein the action manager is further adapted to generate one or more of:
presentation metadata for the action definition that defines how an action to be selected is presented to a user, said presentation metadata optionally comprising a description of the action, a description of the one or more parameters to be propagated to the target and/or the manner in which any data returned by the action is to be presented; and
security metadata for the action definition comprising at least one of security credentials for the target, entity permissions for modification of an action definition, and entity permissions for selection of an action.

6. The system of claim 1, wherein the data association manager is further adapted to assign an action defined by an action definition to an artifact, the artifact being configured to output the data produced by the analytic engine, the assignment defining at least a portion of the relationship between the data produced by the analytic engine and the action definition.

7. The system of claim 1, wherein the invocation of a target comprises invoking one of a function, process, script, workflow or service or navigating to an external system.

8. The system of claim 1, wherein the action manager is further adapted to modify an existing action definition within the repository.

9. The system of claim 1, wherein the entity is a user or an agent and the system respectively further comprises:
a graphical user interface wherein the implementation engine is further adapted to provide available actions for selection by the user using said interface; or
an agent interface wherein the implementation engine is further adapted to provide available actions for automated selection by the agent using said interface.

10. A computer-implemented method for implementation on a processor comprising:
generating an action definition, the action definition defining an action to be selected by an entity, the action comprising the invocation of a target, the action definition comprising metadata for use in locating the target and for use in propagating one or more parameters to the target;
storing the action definition;
defining a relationship between data produced by an analytic engine through the execution of one or more analytic queries and the action definition;
determining whether the action is available in response the execution of analytic queries, based on the previously defined relationship, wherein determining whether the action is available further comprises retrieving one or more action definitions that are recommended by a learning data model in response the execution of analytic queries, the learning data model dynamically modeling the relationship between data produced by the analytic engine and one or more action definitions; and
if the action is available, using the action definition to invoke the target in response to selection of the action by the entity, the invocation of the target including propagating data produced by the analytic engine into said target based on the metadata to perform the action.

11. The method of claim 10 wherein the step of defining the relationship comprises defining one or more conditional rules that specify when the action associated with the action definition is available, the conditional rules being based on at least one of the data produced by the analytic engine and session information for the entity.

12. The method of claim 10, further comprising, before the step of generating an action definition:
inspecting an external system using one or more discovery services; and
generating values for the metadata for use in locating the target and for use in propagating one or more parameters to the target.

13. The method of claim 10, wherein the step of generating an action definition and/or defining the relationship further comprise:
generating mapping metadata that defines any data transformations that are required to transform the data produced by the analytic engine into a form suitable for the target.

14. The method of claim 10, wherein the step of generating an action definition further comprises:
generating presentation metadata for the action definition that defines how an action to be selected is presented to a user, said presentation metadata optionally comprising a description of the action, a description of the one or more parameters to be propagated to the target and/or the manner in which any data returned by the action is to be presented; and
generating security metadata for the action definition comprising at least one of security credentials for the target, entity permissions for modification of an action definition, and entity permissions for selection of an action.

15. The method of claim 10, wherein the step of defining the relationship further comprises:
assigning an action defined by an action definition to an artifact, the artifact being configured to output the data produced by the analytic engine, the assignment defining at least a portion of the relationship between the data produced by the analytic engine and the action definition.

16. The method of claim 10, wherein the invocation of a target comprises invoking one of a function, process, script, workflow or service or navigating to an external system.

17. The method of claim 10, further comprising:
modifying an existing action definition.

18. The method of claim 10, further comprising:
recording the action selected by the entity in the presence of the data produced by the analytic engine;

determining the outcome of the selected action; and collating the information from the recording and determining steps to update the learning data model.

19. The method of claim 10, wherein the entity is a user or an agent and the method further comprises:

providing a graphical user interface, wherein an available action may be selected by the user using said interface; or providing an agent interface wherein an available action may be automatically selected by the agent using said interface.

20. A system comprising:

a processor; and a memory coupled with and readable by the processor and storing a set of instructions which, when executed by the processor, cause the processor to:

generate an action definition, the action definition defining an action to be selected by an entity, the action comprising the invocation of a target, the action definition comprising metadata for use in locating the target and for use in propagating one or more parameters to the target;

store the action definition;

define a relationship between data produced by an analytic engine through the execution of one or more analytic queries and the action definition;

determine whether the action is available in response the execution of analytic queries, based on the previously defined relationship, wherein determining whether the action is available further comprises retrieving one or more action definitions that are recommended by a learning data model in response the execution of analytic queries, the learning data model dynamically modeling the relationship between data produced by the analytic engine and one or more action definitions; and if the action is available, use the action definition to invoke the target in response to selection of the action by the entity, the invocation of the target including propagating data produced by the analytic engine into said target based on the metadata to perform the action.

21. The system of claim 20 wherein defining the relationship comprises defining one or more conditional rules that specify when the action associated with the action definition is available, the conditional rules being based on at least one of the data produced by the analytic engine and session information for the entity.

22. The system of claim 20, further comprising, before generating an action definition:

inspecting an external system using one or more discovery services; and generating values for the metadata for use in locating the target and for use in propagating one or more parameters to the target.

23. The system of claim 20, wherein generating an action definition and/or defining the relationship further comprise:

generating mapping metadata that defines any data transformations that are required to transform the data produced by the analytic engine into a form suitable for the target.

24. The system of claim 20, wherein generating an action definition further comprises:

generating presentation metadata for the action definition that defines how an action to be selected is presented to a user, said presentation metadata optionally comprising a description of the action, a description of the one or more parameters to be propagated to the target and/or the manner in which any data returned by the action is to be presented; and generating security metadata for the action definition comprising at least one of security credentials for the target, entity permissions for modification of an action definition, and entity permissions for selection of an action.

25. The system of claim 20, wherein defining the relationship further comprises:

assigning an action defined by an action definition to an artifact, the artifact being configured to output the data produced by the analytic engine, the assignment defining at least a portion of the relationship between the data produced by the analytic engine and the action definition.

26. A computer-readable memory comprising a set of instructions stored therein which, when executed by a processor, cause the processor to:

generate an action definition, the action definition defining an action to be selected by an entity, the action comprising the invocation of a target, the action definition comprising metadata for use in locating the target and for use in propagating one or more parameters to the target;

store the action definition;

define a relationship between data produced by an analytic engine through the execution of one or more analytic queries and the action definition;

determine whether the action is available in response the execution of analytic queries, based on the previously defined relationship, wherein determining whether the action is available further comprises retrieving one or more action definitions that are recommended by a learning data model in response the execution of analytic queries, the learning data model dynamically modeling the relationship between data produced by the analytic engine and one or more action definitions; and if the action is available, use the action definition to invoke the target in response to selection of the action by the entity, the invocation of the target including propagating data produced by the analytic engine into said target based on the metadata to perform the action.

* * * * *

UNITED STATES PATENT AND TRADEMARK OFFICE
CERTIFICATE OF CORRECTION

| | | Page 1 of 1 |
|---|---|---|
| PATENT NO. | : 8,543,527 B2 | |
| APPLICATION NO. | : 12/684861 | |
| DATED | : September 24, 2013 | |
| INVENTOR(S) | : Bates et al. | |

It is certified that error appears in the above-identified patent and that said Letters Patent is hereby corrected as shown below:

In the Specifications

In column 12, line 45, delete "S10" and insert -- S510 --, therefor.

Signed and Sealed this
Twenty-fifth Day of February, 2014

Michelle K. Lee
*Deputy Director of the United States Patent and Trademark Office*